(12) United States Patent
Takamura et al.

(10) Patent No.: US 11,758,181 B2
(45) Date of Patent: Sep. 12, 2023

(54) ENCODING METHOD, ENCODING APPARATUS, AND PROGRAM

(71) Applicants: NIPPON TELEGRAPH AND TELEGRAPH CORPORATION, Tokyo (JP); INTER-UNIVERSITY RESEARCH INSTITUTE CORPORATION RESEARCH ORGANIZATION OF INFORMATION AND SYSTEMS, Tachikawa (JP)

(72) Inventors: Seishi Takamura, Musashino (JP); Gene Cheung, North York (CA); Cheng Yang, Minhang District Shanghai (CN)

(73) Assignees: NIPPON TELEGRAPH AND TELEPHONE CORPORATION, Tokyo (JP); Inter-University Research Institute Corporation Research Organization Of Information And Systems, Tokyo (JP)

( * ) Notice: Subject to any disclaimer, the term of this patent is extended or adjusted under 35 U.S.C. 154(b) by 32 days.

(21) Appl. No.: 17/437,583

(22) PCT Filed: Nov. 29, 2019

(86) PCT No.: PCT/JP2019/046710
§ 371 (c)(1),
(2) Date: Sep. 9, 2021

(87) PCT Pub. No.: WO2020/183811
PCT Pub. Date: Sep. 17, 2020

(65) Prior Publication Data
US 2022/0141483 A1 May 5, 2022

(30) Foreign Application Priority Data
Mar. 14, 2019 (JP) .................. 2019-047260

(51) Int. Cl.
| | |
|---|---|
| H04N 19/527 | (2014.01) |
| H04N 19/103 | (2014.01) |
| H04N 19/137 | (2014.01) |
| H04N 19/172 | (2014.01) |
| H04N 19/60 | (2014.01) |

(52) U.S. Cl.
CPC ......... *H04N 19/527* (2014.11); *H04N 19/103* (2014.11); *H04N 19/137* (2014.11); *H04N 19/172* (2014.11); *H04N 19/60* (2014.11)

(58) Field of Classification Search
CPC .. H04N 19/527; H04N 19/103; H04N 19/137; H04N 19/172; H04N 19/60
See application file for complete search history.

(56) References Cited

U.S. PATENT DOCUMENTS

| | | | | |
|---|---|---|---|---|
| 2008/0007700 A1* | 1/2008 | vanBaar | ............... | H04N 9/3194 353/94 |
| 2010/0215101 A1* | 8/2010 | Jeon | ..................... | H04N 19/583 375/E7.243 |

(Continued)

OTHER PUBLICATIONS

ISO/IEC 14496-2: 2004, Information technology—Coding of audio-visual objects—Part 2: Visual.

(Continued)

*Primary Examiner* — Tracy Y. Li
(74) *Attorney, Agent, or Firm* — Harness, Dickey & Pierce, P.L.C.

(57) ABSTRACT

An encoding method is performed by an encoding apparatus, and the encoding method includes a step in which an image of an object captured by a camera in a plurality of frames of a moving image is analyzed and it is determined whether camera parameters relating to an intrinsic matrix of the camera are invariable, a step in which, when the camera parameters are invariable, six parameters representing destinations of three points for a projective transformation unit of the image of the object are generated, and a homography matrix is generated on the basis of the six parameters, and (Continued)

a step in which projective transformation is performed on the projective transformation unit of the image of the object using the homography matrix, and a prediction signal of the image of the object is generated on the basis of the result of the projective transformation.

5 Claims, 12 Drawing Sheets

(56) References Cited

U.S. PATENT DOCUMENTS

| | | | |
|---|---|---|---|
| 2012/0229602 A1* | 9/2012 | Chen | H04N 19/597 348/43 |
| 2021/0006806 A1* | 1/2021 | Schwarz | H04N 19/597 |

OTHER PUBLICATIONS

Feng Zou et al., Improved affine motion prediction, JVET-C0062, May 2016.

Matthias Narroschke et al., Extending HEVC by an affine motion model, Picture Coding Symposium 2013.

ISO/IEC 14496-10: 2014, Information technology—Coding of audio-visual objects—Part 10: Advanced Video Coding.

ISO/IEC 23008-2: 2015, Information technology—High efficiency coding and media delivery in heterogeneous environments—Part 2: High efficiency video coding.

Cheng Yang et al., RD-Optimized 3D Planar Model Reconstruction & Encoding for Video Compression, 2018 IEEE International Conference on Image Processing.

2018 IEEE International Conference on Image Processing, Oct. 7-10, 2018, Athens, Greece, Imaging beyond imagination.

* cited by examiner

| no_of_sprite_warping_points | Number of parameters | Name of transform | Usage example | Target that can be compensated for |
|---|---|---|---|---|
| 1 | 2 | Translation | H.264/AVC, H.265/HEVC | Translation of an image of an object in equidistance planes from a camera |
| 2 | 4 | Similarity transformation (Helmert transformation) | Non-Patent Document 2 | In addition to the above, rotation, enlargement and reduction of an image of an object |
| 3 | 6 | Affine transformation | Non-Patent Document 2 and 3 | In addition to the above, shear deformation of an image of an object |
| 4 | 8 | Projective transformation | Non-Patent Document 1 | In addition to the above, movement of an image of a flat object captured by a moving camera and deformation of a still object with an arbitrary shape captured by a camera with fixed pan, tilt or zoom parameters and the like |

FIG. 7

ENCODING METHOD, ENCODING APPARATUS, AND PROGRAM

TECHNICAL FIELD

This application is a 371 U.S. National Phase of International Application No. PCT/JP2019/046710, filed Nov. 29, 2019, which claims priority to Japanese Patent Application No. 2019-047260, filed Mar. 14, 2019. The entire disclosures of the above applications are incorporated herein by reference.

BACKGROUND ART

A camera may capture a moving image of an object having a flat exterior shape such as a picture, a tablet terminal or the ground (hereinafter referred to as a "flat object"). The shape, size and position of the image of the object captured in the frame of a moving image change for each frame of the moving image according to movement of the object and movement of the camera. An encoding apparatus may compensate for movement of the image of the object (motion compensation) so that the shape, the size and position of the captured image of the flat object are the same in each frame of the moving image.

Advanced simple profile (ASP) of MPEG-4 (refer to Non-Patent Document 1), which is one moving image coding standard, adopts a motion compensation method called global motion compensation (GMC). The encoding apparatus performs motion compensation by defining a 2D motion vector for each corner of a moving image frame.

FIG. 7 is a diagram relating to "no_of_sprite_warping_points" which is one syntax element. If the value of "no_of_sprite_warping_points" is 4, the encoding apparatus performs a global motion compensation using projective transformation. One 2D motion vector has two parameters. Therefore, the encoding apparatus transmits 8 (=2×4) parameters to a decoding apparatus for each processing unit of global motion compensation.

If the value of "no_of_sprite_warping_points" is 3, the encoding apparatus performs a motion compensation using similarity transformation. The degree of freedom of similarity transformation is lower than the degree of freedom of projective transformation. If the value of "no_of_sprite_warping_points" is 2, the encoding apparatus performs a motion compensation using affine transformation. The degree of freedom of affine transformation is lower than the degree of freedom of projective transformation. Therefore, a method of adaptively switching the value of "no_of_sprite_warping_points" by 2 or 3 has been proposed as a draft standard of the Joint Exploration team on Future Video Coding (JVET) (refer to Non-Patent Document 2).

Motion compensation using a transformation equivalent to affine transformation when the value of "no_of_sprite_warping_points" is 3 has been proposed (refer to Non-Patent Document 3). The encoding apparatus motion-compensates only for deformation of the image of the object that translates between frames (non-rotational movement) with H.264/AVC (Advanced Video Coding) (refer to Non-Patent Document 4) and H.265/HEVC (High Efficiency Video Coding) (refer to Non-Patent Document 5). This motion compensation corresponds to motion compensation when the value of "no_of_sprite_warping_points" is 1.

The relational expression of coordinates in the 2D image (frame) captured by the camera while a flat object (rigid component) present in a 3D space moves is represented by Formula (1).

$$\begin{pmatrix} x'_1 \\ y'_1 \\ x'_2 \\ y'_2 \\ x'_3 \\ y'_3 \\ x'_4 \\ y'_4 \end{pmatrix} = \begin{pmatrix} x_1 & y_1 & 1 & 0 & 0 & 0 & -x_1 x'_1 & -y_1 x'_1 \\ 0 & 0 & 0 & x_1 & y_1 & 1 & -x_1 y'_1 & -y_1 y'_1 \\ x_2 & y_2 & 1 & 0 & 0 & 0 & -x_2 x'_2 & -y_2 x'_2 \\ 0 & 0 & 0 & x_2 & y_2 & 1 & -x_2 y'_2 & -y_2 y'_2 \\ x_3 & y_3 & 1 & 0 & 0 & 0 & -x_3 x'_3 & -y_3 x'_3 \\ 0 & 0 & 0 & x_3 & y_3 & 1 & -x_3 y'_3 & -y_3 y'_3 \\ x_4 & y_4 & 1 & 0 & 0 & 0 & -x_4 x'_4 & -y_4 x'_4 \\ 0 & 0 & 0 & x_4 & y_4 & 1 & -x_4 y'_4 & -y_4 y'_4 \end{pmatrix} \begin{pmatrix} h_{11} \\ h_{12} \\ h_{13} \\ h_{21} \\ h_{22} \\ h_{23} \\ h_{31} \\ h_{32} \end{pmatrix} \quad (1)$$

FIG. 8 is a diagram showing an example of projective transformation based on four motion vectors. When four points "$(x_1, y_1), \ldots, (x_4, y_4)$" of a frame 400 correspond to four points "$(x'_1, y'_1), \ldots, (x'_4, y'_4)$" of a frame 401, the encoding apparatus can derive "$h_{11}, \ldots, h_{32}$" by solving the linear equation of Formula (1). Here, the four points "$(x_1, y_1) \ldots (x_4, y_4)$" of the frame 400 may not necessarily be vertices of the rectangular frame 400.

The encoding apparatus performs projective transformation based on "$h_{11}, \ldots, h_{32}$" and Formulae (2) to (5) and derives the point (x', y') of the frame 401 corresponding to the point (x, y) of the frame 400. The 3×3 matrix "H" of Formula (2) is a homography matrix.

$$H = \begin{pmatrix} h_{11} & h_{21} & h_{31} \\ h_{12} & h_{22} & h_{32} \\ h_{13} & h_{23} & 1 \end{pmatrix} \quad (2)$$

$$\begin{pmatrix} v_x \\ v_y \\ v_l \end{pmatrix} = H \begin{pmatrix} x \\ y \\ 1 \end{pmatrix} \quad (3)$$

$$x' = v_x / v_l \quad (4)$$

$$y' = v_y / v_l \quad (5)$$

Eight parameters ($x'_1, y'_1, \ldots, x'_4, y'_4$) representing destinations of four known points in the frame 400 are parameters necessary for the encoding apparatus to transform the point (x, y) to the point (x', y'). This means that there are eight variables "$h_{11}, \ldots, h_{32}$" of the homography matrix H and the global motion compensation of MPEG-4 ASP is "no_of_sprite_warping_points=4 (number of parameters=8).

CITATION LIST

Non-Patent Documents

[Non-Patent Document 1]
ISO/IEC 14496-2:2004 Information technology—Coding of audio-visual objects—Part 2: Visual
[Non-Patent Document 2]
F. Zou, J. Chen, M. Karczewicz, X. Li, H.-C. Chuang, W.-J. Chien "Improved affine Motion Prediction", JVET-C0062, May 2016
[Non-Patent Document 3]
M. Narroschke, R. Swoboda, "Extending HEVC by an affine motion model", Picture coding symposium 2013
[Non-Patent Document 4]
ISO/IEC 14496-10:2014 Information technology—Coding of audio-visual objects—Part 10: Advanced Video Coding

[Non-Patent Document 5]
ISO/IEC 23008-2:2015 Information technology—High efficiency coding and media delivery in heterogeneous environments—Part 2: High efficiency video coding

SUMMARY OF INVENTION

Technical Problem

In this manner, when an image of a flat object captured from a moving camera is deformed according to relative positions of the camera and the object, or the like, an encoding apparatus performs motion compensation using projective transformation based on eight parameters. In addition, even if an image of a stationary object having an arbitrary shape captured by a camera whose position is fixed is deformed according to camera parameters of the camera, the encoding apparatus performs motion compensation using projective transformation based on eight parameters.

However, there are restrictions on physical deformation of a flat object. Therefore, the degree of freedom of physical deformation of a flat object is less than the degree of freedom of deformation (eight parameters) that projective transformation can express.

FIG. 9 is a diagram showing an example of a flat plate (rigid component). FIG. 10 to FIG. 15 are diagrams showing a first example to a sixth example of deformation of the flat plate shown in FIG. 9. In FIG. 9 to FIG. 15, the flat plate is represented as a checkerboard. When the orientation of the camera whose position is fixed changes according to camera parameters, the image of the flat plate shown in FIG. 9 is deformed like the image of the flat plate shown in FIG. 10 or FIG. 11. When the orientation of the moving camera changes, the image of the flat plate shown in FIG. 9 is rotated and reduced like the image of the flat plate shown in FIG. 12.

Since the flat plate shown in FIG. 9 is a rigid component, abnormal deformation of the image of the flat plate shown in FIG. 13 to FIG. 15 is clearly unnatural. However, the encoding apparatus expresses deformation of the image of the flat plate shown in FIG. 13 to FIG. 15 using projective transformation with eight parameters (degrees of freedom). In this manner, a conventional encoding apparatus may not improve encoding efficiency of an image.

In view of the above circumstances, an object of the present invention is to provide an encoding method, an encoding apparatus and a program through which it is possible to improve encoding efficiency of an image.

Solution to Problem

An aspect of the present invention is an encoding method performed by an encoding apparatus, including steps in which, on the basis of an image of an object captured by a camera in a plurality of frames of a moving image, it is determined whether camera parameters relating to an intrinsic matrix of the camera are the same in the plurality of frames, and the camera parameters are output to a predetermined apparatus when the camera parameters are the same; steps in which, when the camera parameters are the same, six parameters representing destinations of three points defined in the image of the object are generated, a homography matrix is generated on the basis of the six parameters, and the six parameters are output to the predetermined apparatus; a step in which projective transformation using the homography matrix is performed on a decoded image of the moving image; a step in which a prediction residual signal which is a difference between the result of the projective transformation and the frame is generated; and a step in which the prediction residual signal is encoded.

An aspect of the present invention is an encoding apparatus including an analyzer configured to, on the basis of an image of an object captured by a camera in a plurality of frames of a moving image, determine whether camera parameters relating to an intrinsic matrix of the camera are the same in the plurality of frames, and output the camera parameters to a predetermined apparatus when the camera parameters are the same; a matrix generator configured to, when the camera parameters are the same, generate six parameters representing destinations of three points defined in the image of the object, generate a homography matrix on the basis of the six parameters, and output the six parameters to the predetermined apparatus; a projective transformer configured to perform projective transformation using the homography matrix on a decoded image of the moving image; a subtracter configured to generate a prediction residual signal which is a difference between the result of the projective transformation and the frame; and an encoder configured to encode the prediction residual signal.

An aspect of the present invention is a program causing a computer to function as the above encoding apparatus.

Advantageous Effects of Invention

According to the present invention, it is possible to improve encoding efficiency of an image.

BRIEF DESCRIPTION OF DRAWINGS

FIG. 7 is a diagram relating to "no_of_sprite_warping_points" which is one syntax element.

DESCRIPTION OF EMBODIMENTS

Embodiments of the present invention will be described in detail with reference to the drawings.

An encoding apparatus expresses, for example, deformation of an image of an object shown in FIG. 10 to FIG. 15 using projective transformation. Since there are restrictions on physical deformation of an object, the encoding apparatus expresses deformation of the image of the object in a moving image frame using projective transformation with less than eight parameters (degrees of freedom). The encoding apparatus can improve encoding efficiency of the image according to motion compensation with high accuracy using projective transformation with six parameters (degrees of freedom) which is less than eight parameters.

Figure 1:
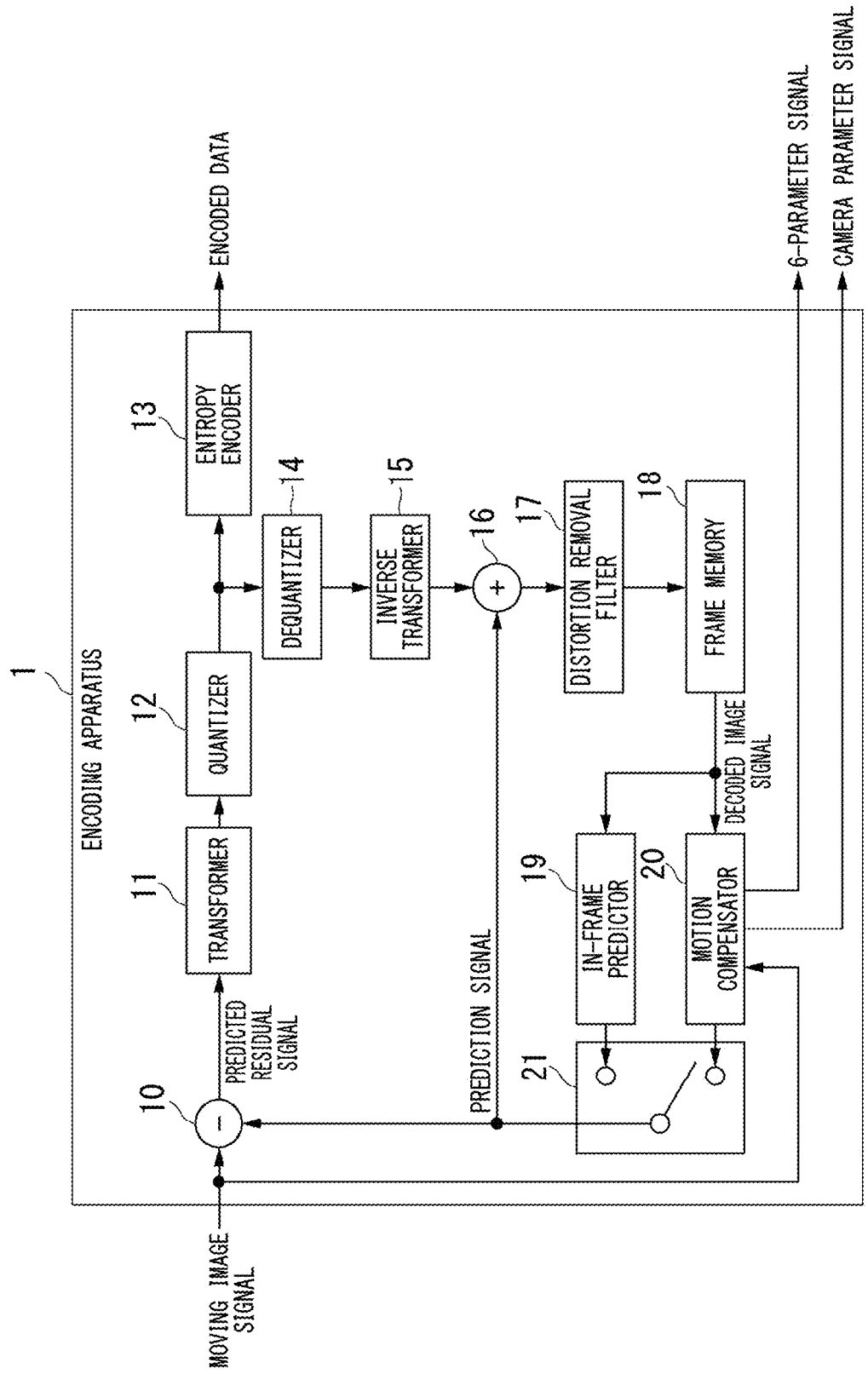
FIG. 1 is a diagram showing a configuration example of an encoding apparatus according to an embodiment.

FIG. 1 is a diagram showing a configuration example of an encoding apparatus 1. The encoding apparatus 1 is an apparatus that encodes a moving image. The encoding apparatus 1 encodes a moving image for each block determined in a moving image frame. The encoding apparatus 1 outputs encoded data to a decoding apparatus. The encoding apparatus 1 outputs a signal representing six parameters (three motion vectors) (hereinafter referred to as a "6-parameter signal") and a signal representing camera parameters (hereinafter referred to as a "camera parameter signal") to an external apparatus (not shown) such as a decoding apparatus.

The encoding apparatus 1 includes a subtracter 10, a transformer 11, a quantizer 12, an entropy encoder 13, a dequantizer 14, an inverse transformer 15, an adder 16, a distortion removal filter 17, a frame memory 18, an intra-frame predictor 19, a motion compensator 20, and a switcher 21.

Functional units of the encoding apparatus 1 other than the motion compensator 20 may operate based on a well-known moving image coding standard, for example. "H.265/HEVC" and "H.264/AVC." A part of the motion compensator 20 in the encoding apparatus 1 may operate based on a well-known moving image coding standard.

A part or all of the encoding apparatus 1 is implemented as software when a processor such as a central processing unit (CPU) or a graphics processing unit (GPU) executes a program stored in a memory which is a non-volatile recording medium (non-transitory computer readable medium). A part or all of the encoding apparatus 1 may be implemented using hardware, for example, a large scale integrated circuit (LSI) or a field programmable gate array (FPGA).

The subtracter 10 subtracts a prediction signal from a moving image signal. The prediction signal is generated for each predetermined processing unit by the intra-frame predictor 19 or the motion compensator 20. The predetermined processing unit is a prediction unit in H.265/HEVC. The subtracter 10 outputs a prediction residual signal, which is a subtraction result, to the transformer 11. The transformer 11 performs discrete cosine transform on the prediction residual signal. The quantizer 12 quantizes the result of discrete cosine transform. The entropy encoder 13 performs entropy encoding on the result of quantization. The entropy encoder 13 outputs encoded data, which is the result of entropy encoding, to an external apparatus (not shown) such as a decoding apparatus.

The dequantizer 14 dequantizes the result of quantization. The inverse transformer 15 performs inverse discrete cosine transform on the result of dequantization. The adder 16 generates a decoded image by adding the result of inverse discrete cosine transform to a prediction signal. The distortion removal filter 17 removes distortion of the decoded image and generates a decoded image signal from which distortion has been removed.

The frame memory 18 stores the decoded image signal from which distortion has been removed. The decoded image signal (local decoded image signal) stored in the frame memory 18 is the same as the decoded image signal generated by the decoding apparatus. The frame memory 18 deletes the decoded image signal that has been stored for a predetermined time or longer from the frame memory 18. Here, the frame memory 18 may store a decoded image signal for a long-time reference frame until the frame memory 18 acquires a deletion instruction. The frame memory 18 may not necessarily store a decoded image signal for an unreferenced frame.

The intra-frame predictor 19 performs intra-frame prediction processing on the decoded image signal and generates a prediction signal according to the result of the intra-frame prediction processing. The motion compensator 20 performs motion compensation prediction processing on the decoded image signal and generates a prediction signal according to the result of the motion compensation prediction processing. The switcher 21 outputs a prediction signal according to the result of the intra-frame prediction processing to the subtracter 10. The switcher 21 outputs a prediction signal according to the result of the motion compensation prediction processing to the subtracter 10.

Next, a configuration example of the motion compensator 20 will be described.

Figure 2:
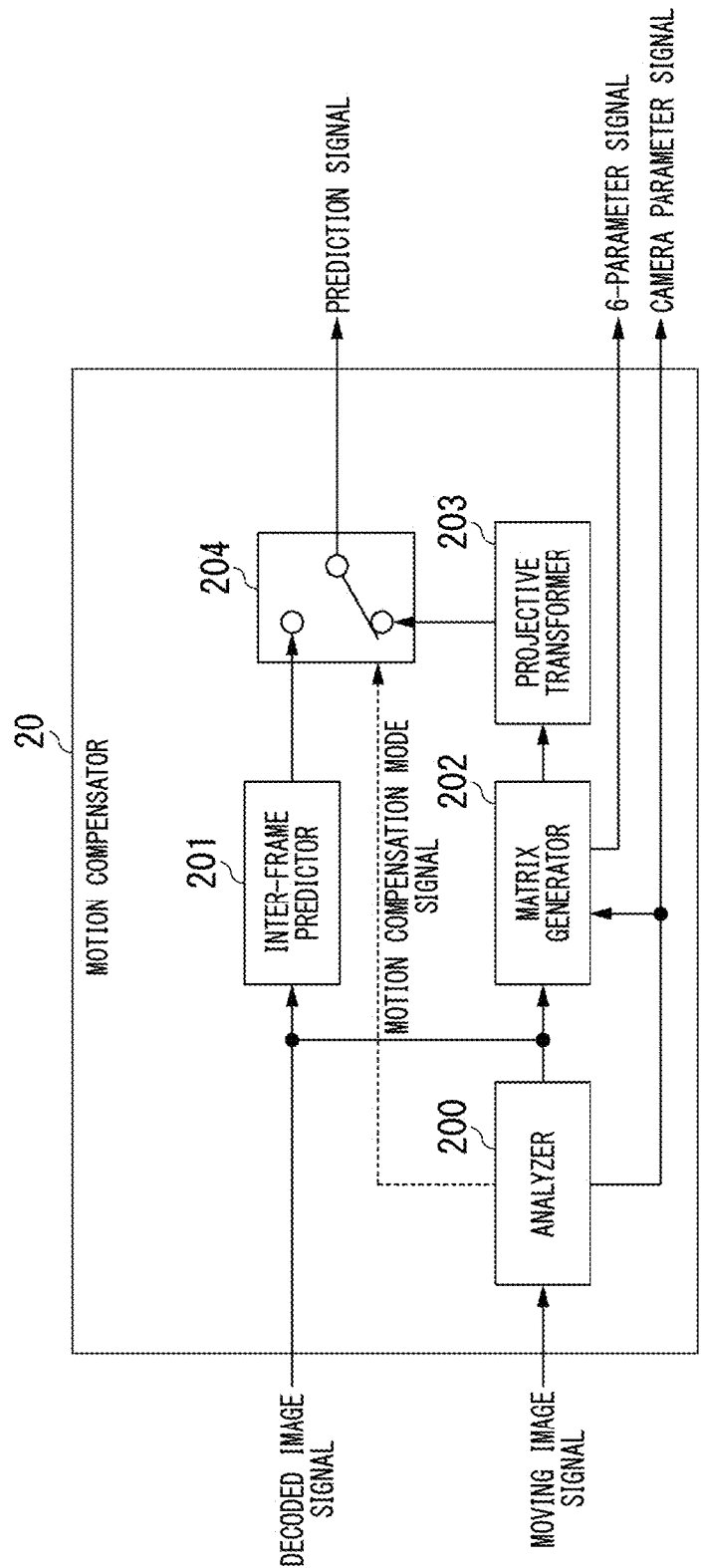
FIG. 2 is a diagram showing a configuration example of a motion compensator according to an embodiment.

FIG. 2 is a diagram showing a configuration example of the motion compensator 20. The motion compensator 20 includes an analyzer 200, an inter-frame predictor 201, a matrix generator 202, a projective transformer 203, and a switcher 204.

The motion compensation mode includes a first mode and a second mode. The first mode is a mode of motion compensation based on inter-frame prediction processing in well-known moving image coding standards such as "H.265/HEVC" and "H.264/AVC." The second mode is a mode of motion compensation in which projective transformation is performed for each projective transformation unit on the decoded image signal (local decoded image signal) stored in the frame memory 18 using a homography matrix based on three motion vectors (6-parameter signal).

The analyzer 200 acquires a plurality of frames (hereinafter referred to as a "frame group") of a moving image in a predetermined period (time interval) as moving image signals. The analyzer 200 determines whether the acquired frame group is a frame group captured during a period in which the camera parameters are invariable. For the frame group captured during a period in which the camera parameters are invariable, the accuracy of projective transformation using a homography matrix is high, and thus the motion compensation in the second mode is more suitable than the motion compensation in the first mode.

When it is determined that the acquired frame group is a frame group captured during a period in which the camera parameters are not invariable, the analyzer 200 generates a motion compensation mode signal representing a first mode (hereinafter referred to as a "first motion compensation mode signal"). The analyzer 200 outputs the first motion compensation mode signal to the inter-frame predictor 201 and the switcher 204.

When it is determined that the acquired frame group is a frame group captured during a period in which the camera parameters are invariable, the analyzer 200 generates a motion compensation mode signal representing a second mode (hereinafter referred to as a "second motion compensation mode signal"). The analyzer 200 outputs the second motion compensation mode signal to the matrix generator 202 and the switcher 204.

When the first motion compensation mode signal is acquired from the analyzer 200, the inter-frame predictor 201 acquires a decoded image signal from the frame memory 18. The inter-frame predictor 201 acquires a moving image signal from the analyzer 200. The inter-frame predictor 201 performs motion compensation on the decoded image signal based on inter-frame prediction processing in well-known moving image coding standards. The inter-frame predictor 201 outputs a prediction signal based on the motion compensation in the first mode to the switcher 204.

When the second motion compensation mode signal is acquired from the analyzer 200, the matrix generator 202 acquires a frame group and a camera parameter signal from the analyzer 200. When the second motion compensation mode signal is acquired from the analyzer 200, the matrix generator 202 acquires a decoded image signal from the frame memory 18.

The matrix generator 202 outputs a 6-parameter signal to an external apparatus (not shown) such as a decoding apparatus and the projective transformer 203 for each frame. The matrix generator 202 outputs a 6-parameter signal to an external apparatus (not shown) such as a decoding apparatus and the projective transformer 203 for each projective transformation unit defined in the decoded image. The external apparatus such as a decoding apparatus can derive a homography matrix using the output camera parameter signal and 6-parameter signal. The matrix generator 202 generates a homography matrix "H" using the output camera parameter signal and 6-parameter signal.

The projective transformer 203 performs projective transformation using the homography matrix "H" on the decoded image signal (local decoded image signal) stored in the frame memory 18. The projective transformer 203 outputs a prediction signal based on the motion compensation in the second mode to the switcher 204.

Figure 3:
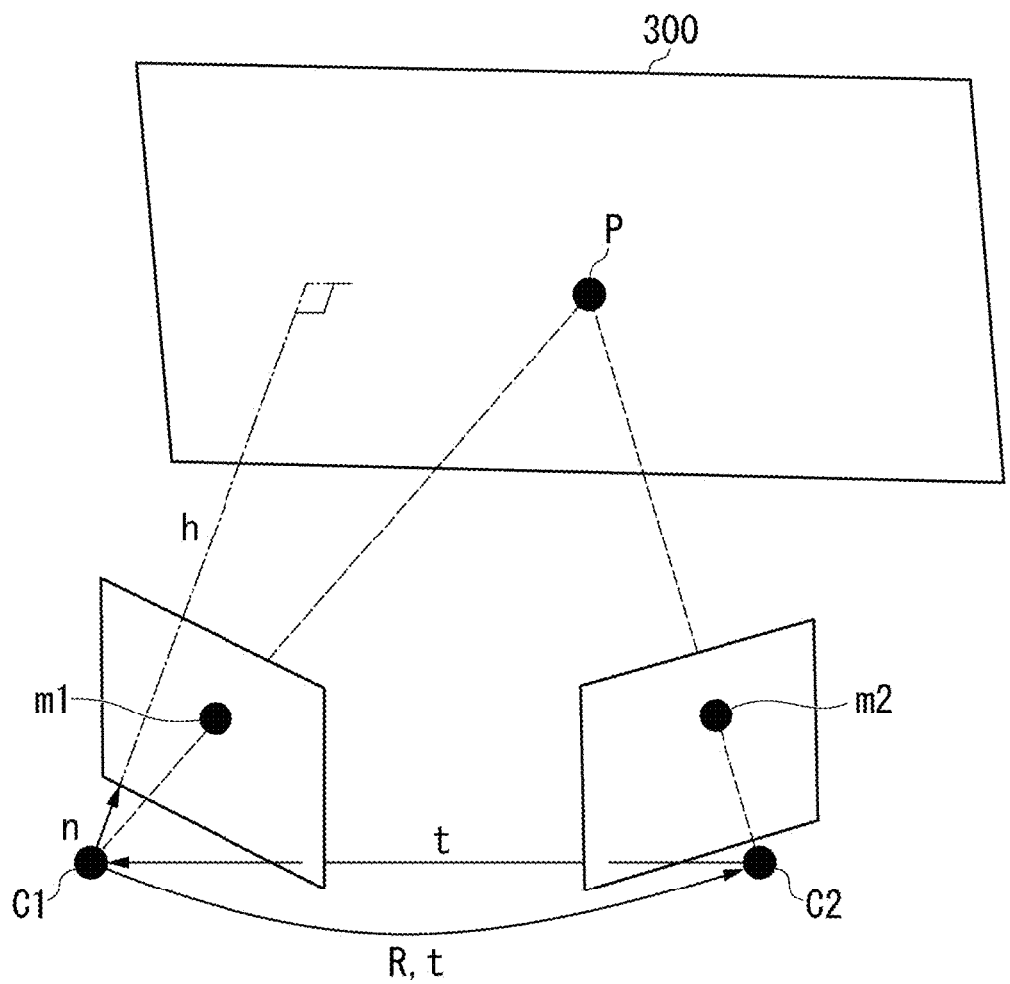
FIG. 3 is a diagram showing an example of coordinates of an image according to an embodiment.

FIG. 3 is a diagram showing an example of coordinates of an image (Reference 1 "Digital Image Processing," CG-ARTS Association, 2015, p. 314). The relationship between the coordinates $(v_x, v_y, v_z)$ of a point P on a plane 300 and the coordinates $(x, y, 1)$ of a moving camera in the 3D space is represented by Formula (6).

$$\begin{pmatrix} v_x \\ v_y \\ v_1 \end{pmatrix} = A\left(R + \frac{tn^T}{h}\right)A^{-1}\begin{pmatrix} x \\ y \\ 1 \end{pmatrix} \quad (6)$$

Here, "h" represents the length of the perpendicular line from a position C1 of the camera to the plane 300. "n" represents a unit vector representing the direction of the perpendicular line. "t" represents a vector in which the start point is the position C1 of the camera and the end point is a position C2 of the camera. "R" represents a rotation matrix with a size of 3×3. That is, "R" represents a space rotation amount when the camera moves from the position C1 to the position C2. "A" represents a camera parameter. Combinations of the coordinates "m1=$(x, y, 1)^T$" of the image of the point P captured from the position C1 and the coordinates "m2=$(x', y', 1)^T$" of the image of the point P captured from the position C2, and the camera parameter "A" represent an intrinsic matrix of the camera. The size of the intrinsic matrix is 3×3. $z^T$ represents a transpose of z, which is a matrix or a vector.

Variations in which all elements of the homography matrix "H" are multiplied by a constant are allowed. The homography matrix "H" is represented by Formula (7) using a predetermined constant λ.

$$\lambda H = A\left(R + \frac{tn^T}{h}\right)A^{-1} \quad (7)$$

Here, the camera parameter "A" is a parameter that does not depend on the position and direction of the camera in the 3D space (Reference 2 "Z. Zhang, Flexible Camera Calibration by Viewing a Plane from Unknown Orientations, Proc. ICCV 1999, vol. 1, pp. 666-673, 1999"). For example, the camera parameter "A" is a pan, tilt and zoom parameter. The analyzer 200 transmits a camera parameter to the matrix generator 202 before the projective transformer 203 performs motion compensation.

In FIG. 3, the position (vector) in the 3D space is expressed using the coordinates "t=$(tx, ty, tz)^T$". The plane 300 is a plane showing the z coordinate "tz=0" of the coordinates t. The length "h" of the perpendicular line from the position C1 of the camera to the plane 300 represents an absolute value of the z coordinate of the coordinates t of the position C1 of the camera. The analyzer 200 transmits an absolute value of the z coordinate of the position C1 of the camera to the matrix generator 202 before the projective transformer 203 performs motion compensation. The unit vector n representing the direction of the perpendicular line from the position C1 of the camera to the plane 300 is always $(0, 0, 1)^T$. Therefore, Formula (8) is a 3D vector.

$$\frac{tn^T}{h} \quad (8)$$

When the camera moves from the position C1 to the position C2, the matrix generator 202 derives a homography matrix "H" based on the space rotation amount "R" and the coordinates "t." The number of parameters necessary and sufficient for the space rotation amount "R" is 3. The space rotation amount "R" is represented by Formula (10) using Formula (9).

$$\begin{cases} R_x(\theta_x) = \begin{pmatrix} 1 & 0 & 0 \\ 0 & \cos\theta_x & \sin\theta_x \\ 0 & -\sin\theta_x & \cos\theta_x \end{pmatrix} \\ R_y(\theta_y) = \begin{pmatrix} \cos\theta_y & 0 & -\sin\theta_y \\ 0 & 1 & 0 \\ \sin\theta_y & 0 & \cos\theta_y \end{pmatrix} \\ R_z(\theta_z) = \begin{pmatrix} \cos\theta_z & \sin\theta_z & 0 \\ -\sin\theta_z & \cos\theta_z & 0 \\ 0 & 0 & 1 \end{pmatrix} \end{cases} \quad (9)$$

$$R = R_x(\theta_x)R_y(\theta_y)R_z(\theta_z) \quad (10)$$

Here, $\theta_x$ represents a rotation angle in the x-axis direction. $\theta_y$ represents a rotation angle in the y-axis direction. $\theta_z$ represents a rotation angle in the z-axis direction. Since the coordinates "t" are a 3D vector, the number of parameters necessary and sufficient for the coordinates "t" is 3. In order for the matrix generator 202 to derive the homography matrix "H," a total number of parameters may be 6, including three parameters necessary and sufficient for the space rotation amount "R" and three parameters necessary and sufficient for the coordinates "t."

The matrix generator 202 derives six parameters ($\theta_x$, $\theta_y$, $\theta_z$, $t_x$, $t_y$, $t_z$) shown in Formula (11) according to a multi-dimensional search process for a predetermined homography matrix "H."

$$\lambda H = A \left( Rx(\theta x) Ry(\theta y) Rz(\theta z) + \begin{pmatrix} 0 & 0 & tx \\ 0 & 0 & ty \\ 0 & 0 & tz \end{pmatrix} \right) A^{-1} \quad (11)$$

The matrix generator 202 may derive six parameters "$\theta_x$, $\theta_y$, $\theta_z$, sx, sy, sz" by multi-dimensional search in which a first column of a space rotation amount "R" is R1, a second column of the space rotation amount "R" is R2, and a third column of the space rotation amount "R" is overwritten.

$$\lambda H = A \left( R1 \; R2 \; \begin{pmatrix} sx \\ sy \\ sz \end{pmatrix} \right) A^{-1} \quad (12)$$

For example, the matrix generator 202 derives six parameters (variable) as shown in Formula (16) by 6-dimensional search based on values shown in Formula (13), Formula (14) and Formula (15).

$$A = \begin{pmatrix} 10 & 0 & 300 \\ 0 & 10 & 200 \\ 0 & 0 & 1 \end{pmatrix} \quad (13)$$

$$(x_1, y_1, x_2, y_2, x_3, y_3) = (0, 0, 0, 400, 600, 400) \quad (14)$$

$$(x'_1, y'_1, x'_2, y'_2, x'_3, y'_3) = (-10, -5, 10, 395, 590, 395) \quad (15)$$

$$(\theta x, \theta y, \theta z, sx, sy, sz) = \quad (16)$$
$$(1.67239437e - 0.3, -6.66960430e - 0.6, 1.30057284e - 04,$$
$$8.40392087e - 03, 1.72441760e - 01, 1.00103488e + 00)$$

The homography matrix "H" is derived as Formula (17).

$$\lambda H = \begin{bmatrix} 1.00020008e + 00 & 5.00417395e - 02 & -9.67386918e\,00 \\ 2.63449370e - 04 & 1.03344646e + 00 & -4.83693459e + 00 \\ 6.66960430e - 07 & 1.6739539e - 04 & 9.67396918e - 01 \end{bmatrix} \quad (17)$$

Here, the matrix generator 202 may derive six parameters necessary and sufficient for deriving the homography matrix "H" by the method shown in Reference 2.

Figure 4:
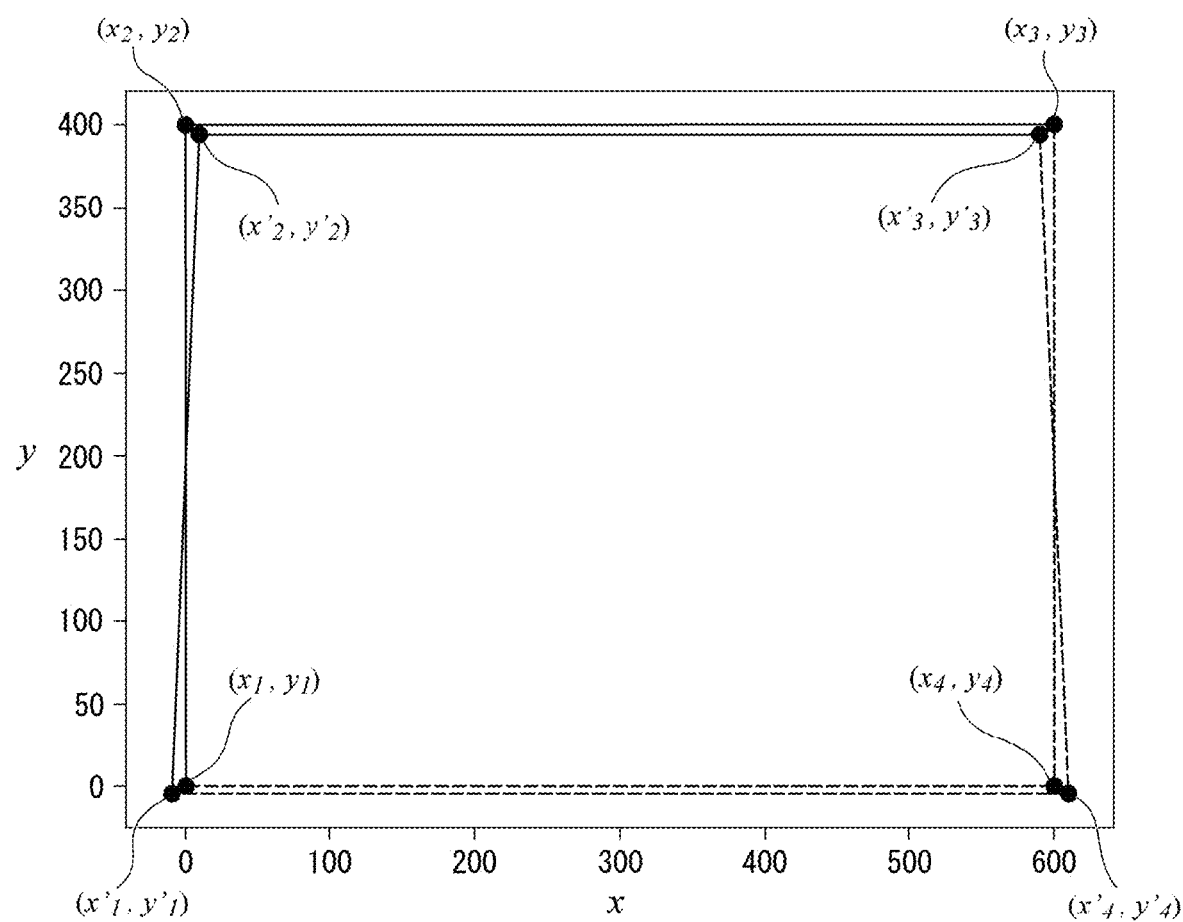
FIG. 4 is a diagram showing an example of projective transformation based on three motion vectors according to an embodiment.

FIG. 4 is a diagram showing an example of projective transformation based on three motion vectors. The projective transformer 203 transforms the point $(x_1, y_1)$ to the point $(x'_1, y'_1)$ based on the motion vector of the point $(x_1, y_1)$. The projective transformer 203 transforms the point $(x_2, y_2)$ to the point $(x'_2, y'_2)$ based on the motion vector of the point $(x_2, y_2)$. The projective transformer 203 transforms the point $(x_3, y_3)$ to the point $(x'_3, y'_3)$ based on the motion vector of the point $(x_3, y_3)$.

The projective transformer 203 transforms the point "$(x_4, y_4)=(600, 0)$" to the point "$(x'_4, y'_4)=(610.1, -4.8346)$" according to projective transformation using the point $(x'_1, y'_1)$, the point $(x'_2, y'_2)$, the point $(x'_3, y'_3)$, and the homography matrix "H."

In this manner, the projective transformer 203 derives the remaining one motion vector according to projective transformation using only six parameters (three motion vectors). That is, the matrix generator 202 generates a homography matrix "H" with only six parameters.

Next, an operation example of the encoding apparatus 1 will be described.

Figure 5:
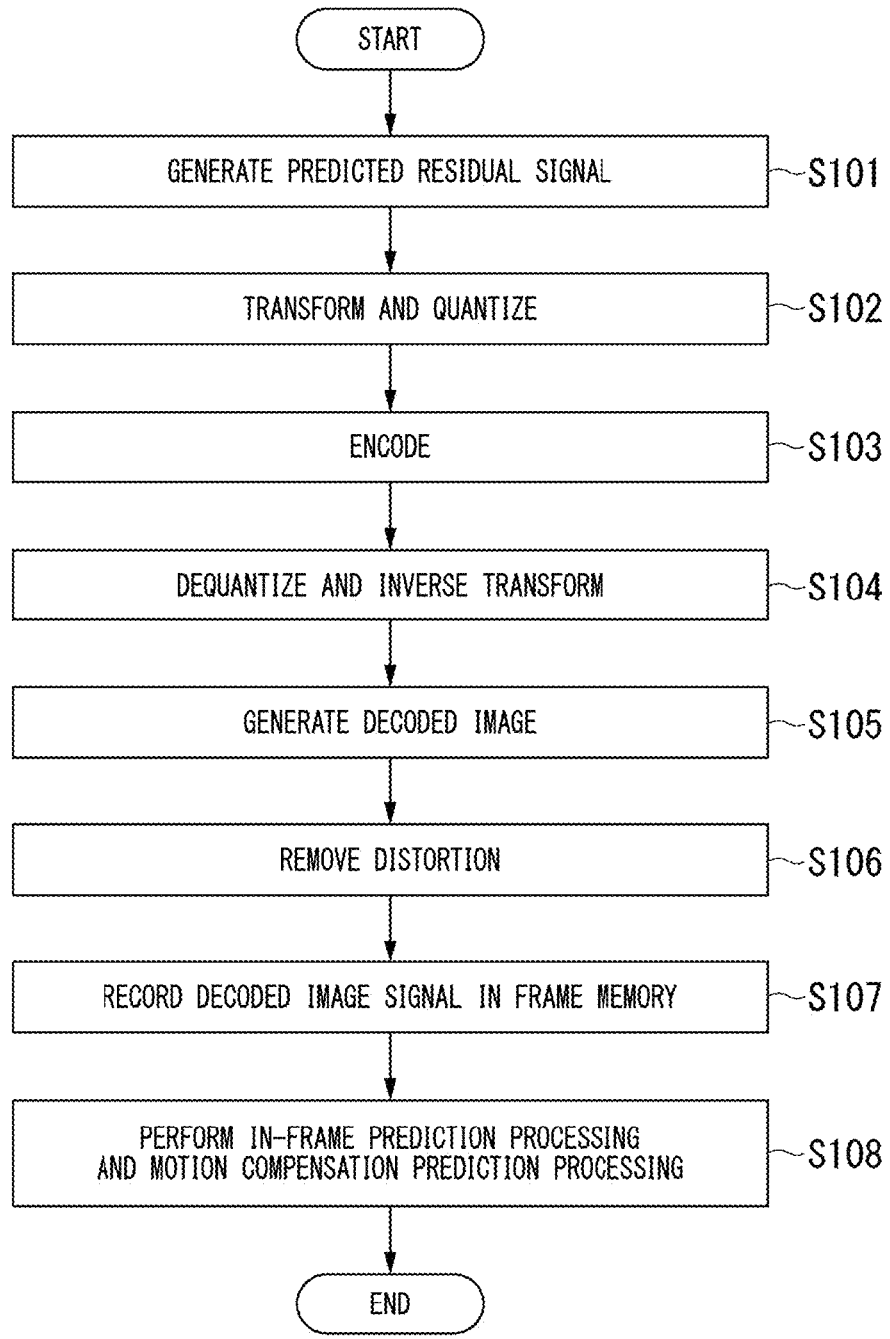
FIG. 5 is a flowchart showing an operation example of an encoding apparatus according to an embodiment.

FIG. 5 is a flowchart showing an operation example of the encoding apparatus 1. The subtracter 10 generates a prediction residual signal (Step S101). The transformer 11 performs discrete cosine transform on the prediction residual signal. The quantizer 12 quantizes the result of discrete cosine transform (Step S102). The entropy encoder 13 performs entropy encoding on the result of quantization (Step S103).

The dequantizer 14 dequantizes the result of quantization. The inverse transformer 15 performs inverse discrete cosine transform on the result of dequantization (Step S104). The adder 16 generates a decoded image by adding the result of inverse discrete cosine transform and the prediction signal (Step S105). The distortion removal filter 17 removes distortion of the decoded image and generates a decoded image signal from which distortion has been removed (Step S106).

The distortion removal filter 17 records the decoded image signal in the frame memory 18 (Step S107). The intra-frame predictor 19 performs intra-frame prediction processing on the decoded image signal and generates a prediction signal according to the result of intra-frame prediction processing. The motion compensator 20 performs motion compensation prediction processing on the decoded image signal and generates a prediction signal according to the result of the motion compensation prediction processing (Step S108).

Figure 6:
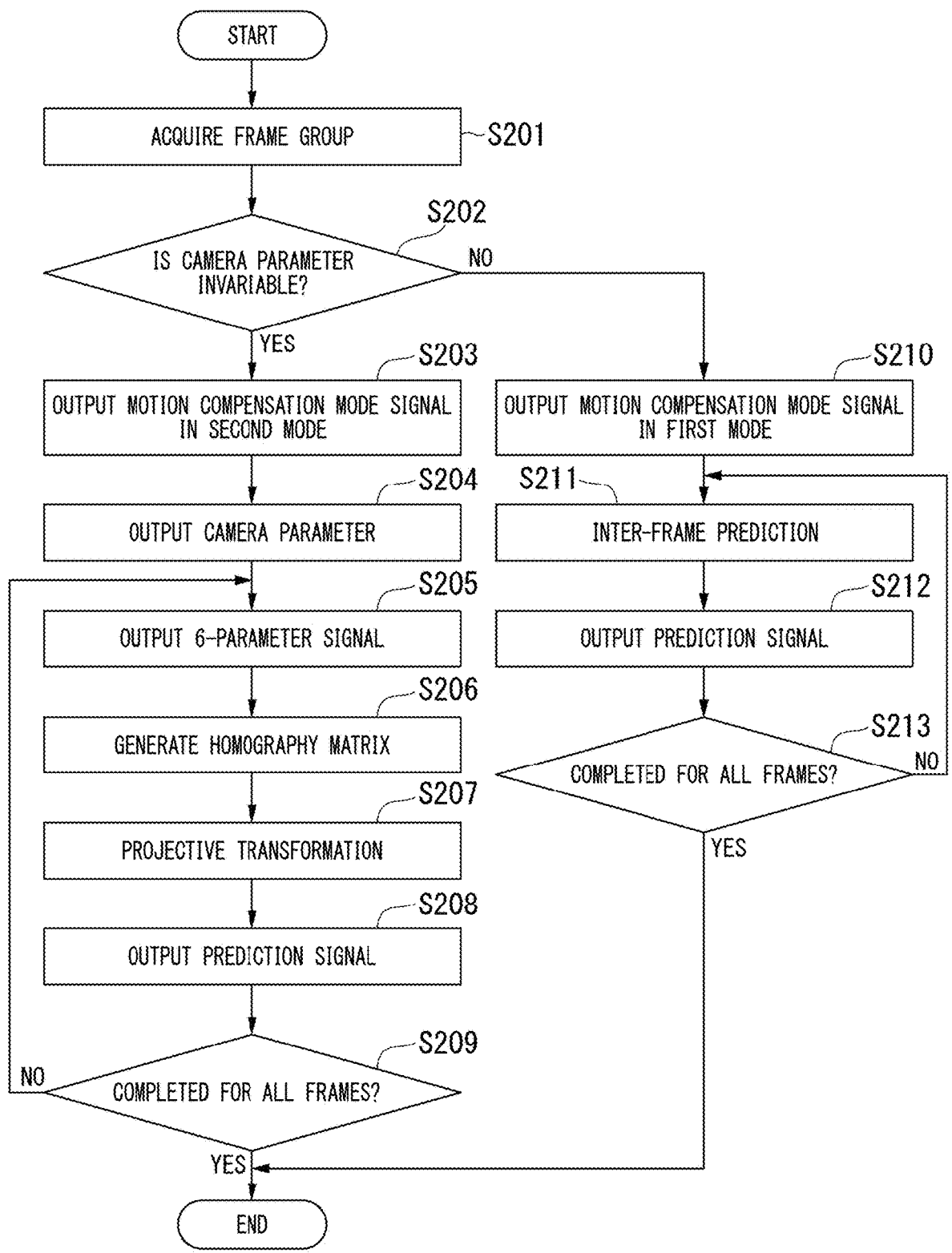
FIG. 6 is a flowchart showing an operation example of a motion compensator according to an embodiment.
Figure 8:
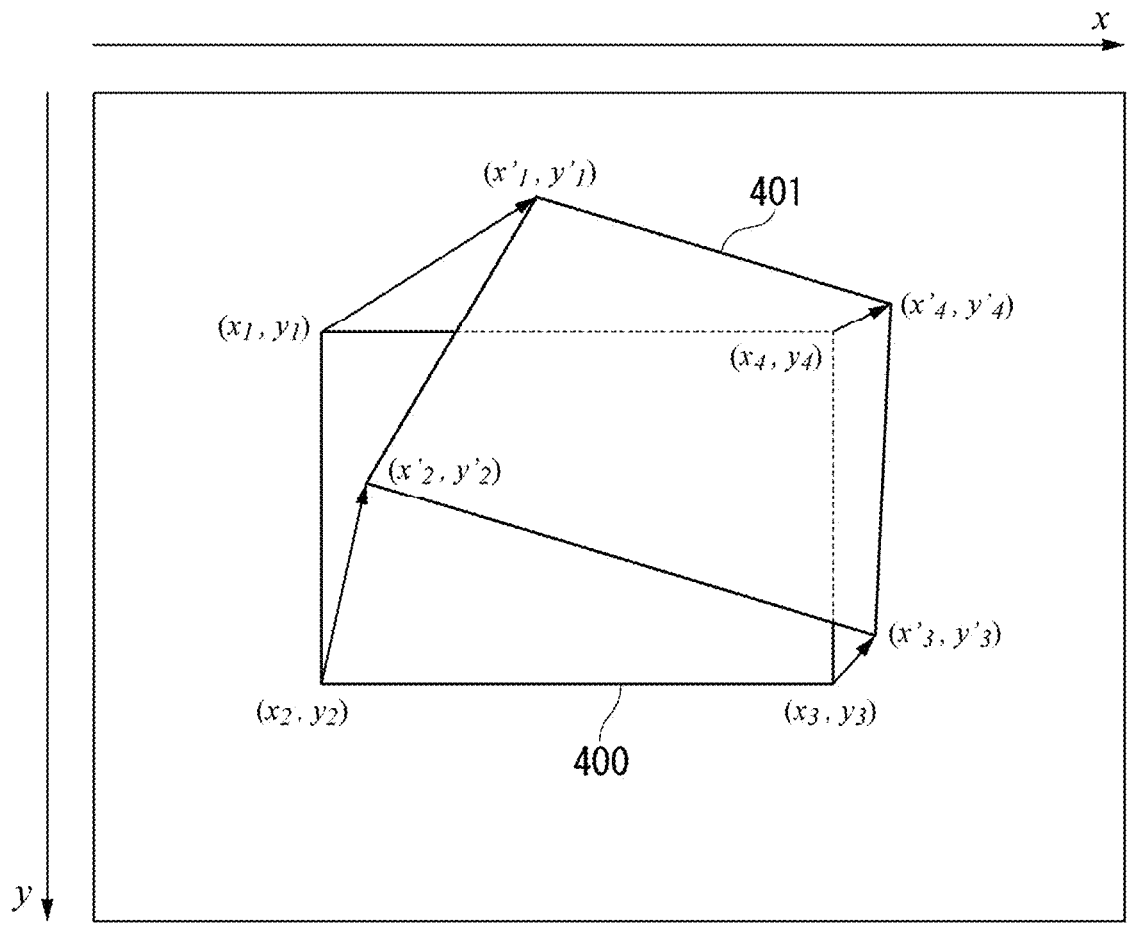
FIG. 8 is a diagram showing an example of projective transformation based on four motion vectors.
Figure 9:
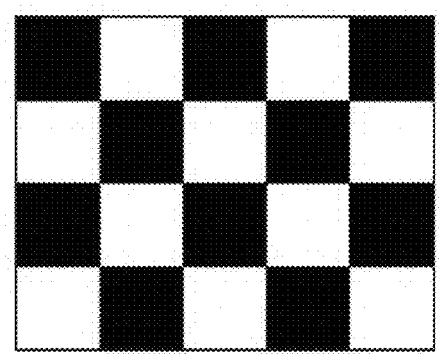
FIG. 9 is a diagram showing an example of a flat plate.
Figure 10:
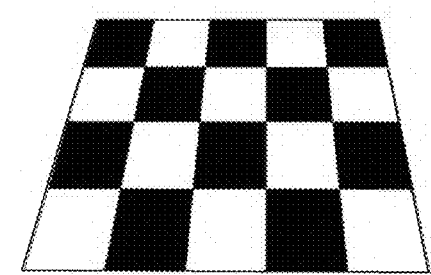
FIG. 10 is a diagram showing a first example of deformation of a flat plate.
Figure 11:
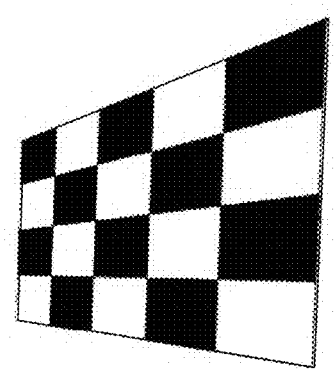
FIG. 11 is a diagram showing a second example of deformation of a flat plate.
Figure 12:
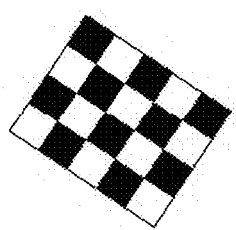
FIG. 12 is a diagram showing a third example of deformation of a flat plate.
Figure 13:
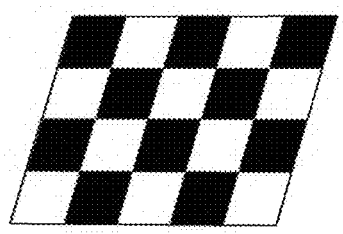
FIG. 13 is a diagram showing a fourth example of deformation of a flat plate.
Figure 14:
FIG. 14 is a diagram showing a fifth example of deformation of a flat plate.
Figure 15:
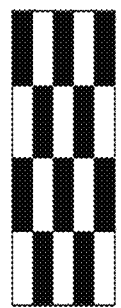
FIG. 15 is a diagram showing a sixth example of deformation of a flat plate.

FIG. 6 is a flowchart showing an operation example of the motion compensator 20. The analyzer 200 acquires a frame group (Step S201). The analyzer 200 analyzes the image of each frame of the frame group and derives camera parameters based on the analysis result. The analyzer 200 determines whether the acquired group is a frame group captured during a period in which the camera parameter "A" is invariable (Step S202).

When the acquired group is a frame group captured during a period in which the camera parameter "A" is invariable (YES in Step S202), the analyzer 200 outputs the second motion compensation mode signal to the matrix generator 202 and the switcher 204 (Step S203).

The analyzer 200 outputs the camera parameter signal to the matrix generator 202. The analyzer 200 outputs the camera parameter signal to an external apparatus (not shown) such as a decoding apparatus (Step S204).

The matrix generator 202 outputs a 6-parameter signal to an external apparatus (not shown) such as a decoding apparatus for each frame. In addition, the matrix generator 202 outputs the 6-parameter signal to the external apparatus (not shown) such as a decoding apparatus for each projective transformation unit (prediction unit) defined in the decoded image (Step S205).

The matrix generator 202 generates a homography matrix "H" using the camera parameter signal and the 6-parameter signal (Step S206). The projective transformer 203 performs motion compensation in the second mode on the decoded image signal (local decoded image signal) stored in the frame memory 18 according to projective transformation using the homography matrix "H" (Step S207).

The projective transformer 203 outputs a prediction signal based on the motion compensation in the second mode to the switcher 204. The switcher 204 outputs a prediction signal based on the motion compensation in the second mode to the subtracter 10 (Step S208).

The projective transformer 203 determines whether the motion compensation in the second mode has been performed on all frames in the acquired frame group (Step S209). When it is determined that the motion compensation in the second mode has not performed for a certain frame (NO in Step S209), the projective transformer 203 returns the process to Step S205. When it is determined that the motion compensation in the second mode has been performed on all frames (YES in Step S209), the matrix generator 202 and the projective transformer 203 end motion compensation processing on the acquired frame group.

When the acquired frame group is a frame group captured during a period in which the camera parameter "A" is not invariable (a frame group suitable for well-known inter-frame prediction processing) (NO in Step S202), the analyzer 200 outputs a first motion compensation mode signal to the inter-frame predictor 201 and the switcher 204 (Step S210).

The inter-frame predictor 201 performs motion compensation on the decoded image signal (local decoded image signal) stored in the frame memory 18 based on inter-frame prediction processing in well-known moving image coding standards (Step S211. The inter-frame predictor 201 outputs the prediction signal based on the motion compensation in the first mode to the switcher 204. The switcher 204 outputs a prediction signal based on the motion compensation in the first mode to the subtracter 10 (Step S212).

The inter-frame predictor 201 determines whether the motion compensation in the first mode has been performed on all frames in the acquired frame group (Step S213). When it is determined that the motion compensation in the first mode has not performed for a certain frame (NO in Step S213), the inter-frame predictor 201 returns the process to Step S211. When it is determined that the motion compensation in the first mode has been performed on all frames (YES in Step S213), the inter-frame predictor 201 ends motion compensation processing on the acquired frame group.

As described above, the encoding apparatus 1 according to the embodiment includes the analyzer 200, the matrix generator 202, and the projective transformer 203. The analyzer 200 analyzes the image of the object captured by the camera in a plurality of frames (frame group) of a moving image. The analyzer 200 determines whether camera parameters relating to the intrinsic matrix of the camera are the same in the frame group based on the analysis result. When the camera parameters relating to the intrinsic matrix of the camera are the same, the analyzer 200 outputs the camera parameters to a predetermined apparatus. When the amount of change in the camera parameters is within a predetermined range, the camera parameters may be considered to be the same. When the camera parameters are the same, the matrix generator 202 generates six parameters (three motion vectors) representing three destination points defined in the captured image of the object. The matrix generator 202 generates a homography matrix based on six parameters. The matrix generator 202 outputs six parameters to a predetermined apparatus. The projective transformer 203 performs projective transformation using the homography matrix on the decoded image of the moving image (local decoded image signal) for the projective transformation unit. The projective transformer 203 outputs the result of projective transformation as a prediction signal based on the motion compensation in the second mode to the switcher 204.

In this manner, the encoding apparatus 1 according to the embodiment generates a small amount of encoded data with which a high-quality decoded image can be generated by motion compensation based on projective transformation of the image of the object. Therefore, the encoding apparatus 1 according to the embodiment can improve encoding efficiency of the image. The encoding apparatus 1 according to the embodiment can reduce overheads by transmitting six parameters for each predetermined camera parameter and projective transformation unit (prediction unit) in the motion compensation for the frame group during the period in which camera parameters are invariable.

While the embodiments of the invention have been described above in detail with reference to the drawings, the specific configuration is not limited to the embodiments, and includes designs and likes without departing from the scope and spirit of the invention.

INDUSTRIAL APPLICABILITY

The present invention can be applied to an encoding apparatus that performs reversible encoding or irreversible encoding on a still image or a moving image.

REFERENCE SIGNS LIST

1 Encoding apparatus
10 Subtracter
11 Transformer
12 Quantizer
13 Entropy encoder
14 Dequantizer
15 Inverse transformer
16 Adder
17 Distortion removal filter
18 Frame memory
19 Intra-frame predictor
20 Motion compensator
21 Switcher
200 Analyzer
201 Inter-frame predictor
202 Matrix generator
203 Projective transformer
204 Switcher
300 Plane
400 Frame
401 Frame
C1 Position
C2 Position

What is claimed is:

1. An encoding method performed by an encoding apparatus, comprising:
   steps in which, on the basis of an image of an object captured by a camera in a plurality of frames of a moving image, it is determined whether camera parameters relating to an intrinsic matrix of the camera are the same in the plurality of frames, and the camera parameters are output to a predetermined apparatus when the camera parameters are the same;
   steps in which, when the camera parameters are the same, six parameters representing destinations of three points defined in the image of the object are generated by a six-dimensional search which updates a third column of a matrix representing a space rotation amount when the camera moves between two positions, a homography matrix is generated on the basis of the six parameters, and the six parameters are output to the predetermined apparatus;

a step in which projective transformation using the homography matrix is performed on a decoded image of the moving image;

a step in which a prediction residual signal which is a difference between the result of the projective transformation and the frame is generated; and a step in which the prediction residual signal is encoded.

2. The encoding method according to claim 1, wherein the object has a flat exterior shape.

3. An encoding apparatus, comprising:

an analyzer configured to, on the basis of an image of an object captured by a camera in a plurality of frames of a moving image, determine whether camera parameters relating to an intrinsic matrix of the camera are the same in the plurality of frames, and output the camera parameters to a predetermined apparatus when the camera parameters are the same;

a matrix generator configured to, when the camera parameters are the same, generate six parameters representing destinations of three points defined in the image of the object by a six-dimensional search which updates a third column of a matrix representing a space rotation amount when the camera moves between two positions, generate a homography matrix on the basis of the six parameters, and output the six parameters to the predetermined apparatus;

a projective transformer configured to perform projective transformation using the homography matrix on a decoded image of the moving image;

a subtracter configured to generate a prediction residual signal which is a difference between the result of the projective transformation and the frame; and an encoder configured to encode the prediction residual signal, wherein each of the analyzer, the matrix generator, the projective transformer, the subtracter and the encoder is implemented by:

i) computer executable instructions executed by the at least one processor, ii) at least one circuitry or iii) a combination of computer executable instructions executed by at least one processor and at least one circuitry.

4. The encoding apparatus according to claim 3, wherein the object has a flat exterior shape.

5. A non-transitory computer readable medium storing a program causing a computer to function as the encoding apparatus according to claim 3.

* * * * *